W. M°Connell,
Molding Machine.
No. 97,210. Patented Nov. 23, 1869.
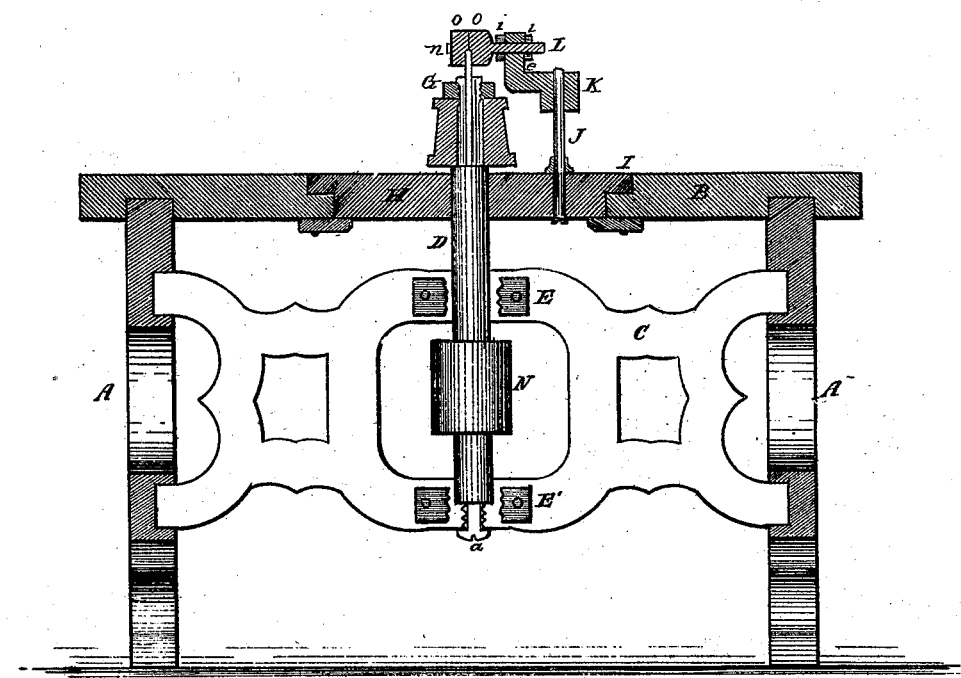
Witnesses.
Samuel R. Forshay
John M°Hugh
W. M°Connell,
Inventor.

United States Patent Office.

WILLIAM McCONNELL, OF CLARKSVILLE, NEW JERSEY.

Letters Patent No. 97,210, dated November 23, 1869.

IMPROVEMENT IN MOULDING-MACHINE.

The Schedule referred to in these Letters Patent and making part of the same.

*To all whom it may concern:*

Be it known that I, WILLIAM McCONNELL, of Clarksville, in the county of Hunterdon, and State of New Jersey, have invented certain new and useful Improvements in Moulding-Machines; and I do hereby declare that the following is a full and exact description thereof, reference being had to the accompanying drawings, forming part of this specification, and to the letters of reference marked thereon.

The nature of my invention consists in the use of a standard, with an adjustable arm, to which is attached a bearing, the object of which is to form a support for the upper end of the shaft or spindle of a machine for cutting mouldings, and to compensate for any wear of the shaft or bearing next under the cutter-head. This adjustable bearing is so constructed that it may be readily adjusted to compensate for any wear in any direction, and, at the same time, be brought to any desired position, so as to support the shaft above the cutter-head on the opposite side of the resistance.

It also consists in placing a rotating disk in the centre of the table-leaf, so that the spindle or shaft will project up through its centre. The object of this disk is to enable the operator to bring the standard, that supports the arm, to any desired position within the radius of the disk. The standard may also serve the purpose of a guide for the stuff, while being worked out by the machine.

In cutting mouldings by machinery, and especially those used for picture and mirror-frames, a great difficulty has been encountered from the cutters attached to the cutter-head hugging or drawing deeper into the wood, especially where there are knots, or where the grain runs transversely to the line of the cutters, or in cutting across the grain of the wood; but it will be seen, that from the nature of my invention, this difficulty is entirely overcome.

To enable others skilled in the art to make and use my invention, I will proceed to describe its construction and operation.

The figure represents a longitudinal sectional elevation of a moulding-machine, with my improvement attached, also shown in sectional elevation.

Letters of like name and kind indicate like parts.

A A represent two uprights, made wide enough to form four feet or bearings to support the leaf or top of the table B, all of which may be made of any proper materials, and of convenient dimensions.

C represents the cross-bars, each end of which is secured in the most rigid manner to the uprights A A, which, together with the other parts already described, constitute the frame of the machine.

D represents an upright shaft that has a perpendicular bearing upon the adjustable stop $a$, and side bearings E E', (broken off in the figure.)

This said shaft D passes up through the top of the table where the cutter-head F is located, and secured by means of a screw-nut, G.

N is the pulley by which the shaft is driven.

In the table-leaf is provided a rotating disk, H, provided with a rabbet or shoulder, I, that corresponds with, and works in another rabbet in the table-leaf, so as to form a bearing or support for the same.

In or near the edge of the disk H is located and secured an upright, J, on which is a movable arm, K.

The end of this arm is turned upward, so as to form an elbow at $e$.

In the upper portion of the elbow is a horizontal shaft or wrist, L, made adjustable by means of set-screws, $i\ i$.

On the outer end of this shaft or wrist is a bearing made in sections, $o\ o$, the outer section being adjusted by means of screw-bolts, $n\ n$, for the purpose of compensating for any wear that may take place on the upper end of the shaft D.

The operation is effectual and satisfactory, and the adjustment, when necessary, is readily effected, as it will be observed that the top bearings are made to move horizontally, and at the same time are allowed to roll, so that they can be adjusted, and readily compensate for wear in any direction.

Having thus described my invention,

What I claim as new, and desire to secure by Letters Patent of the United States, is—

The disk H, uprights J, arm K, adjustable wrist L, and bearings $o\ o$, in combination with the shaft or spindle D, substantially in the manner and for the purposes herein set forth.

WM. McCONNELL.

Witnesses:
SAMUEL R. FORSHAY,
JOHN McHUGH.